Dec. 11, 1934.　　　C. G. MAHANA　　　1,983,628
VEHICLE CONTROL
Filed May 2, 1932
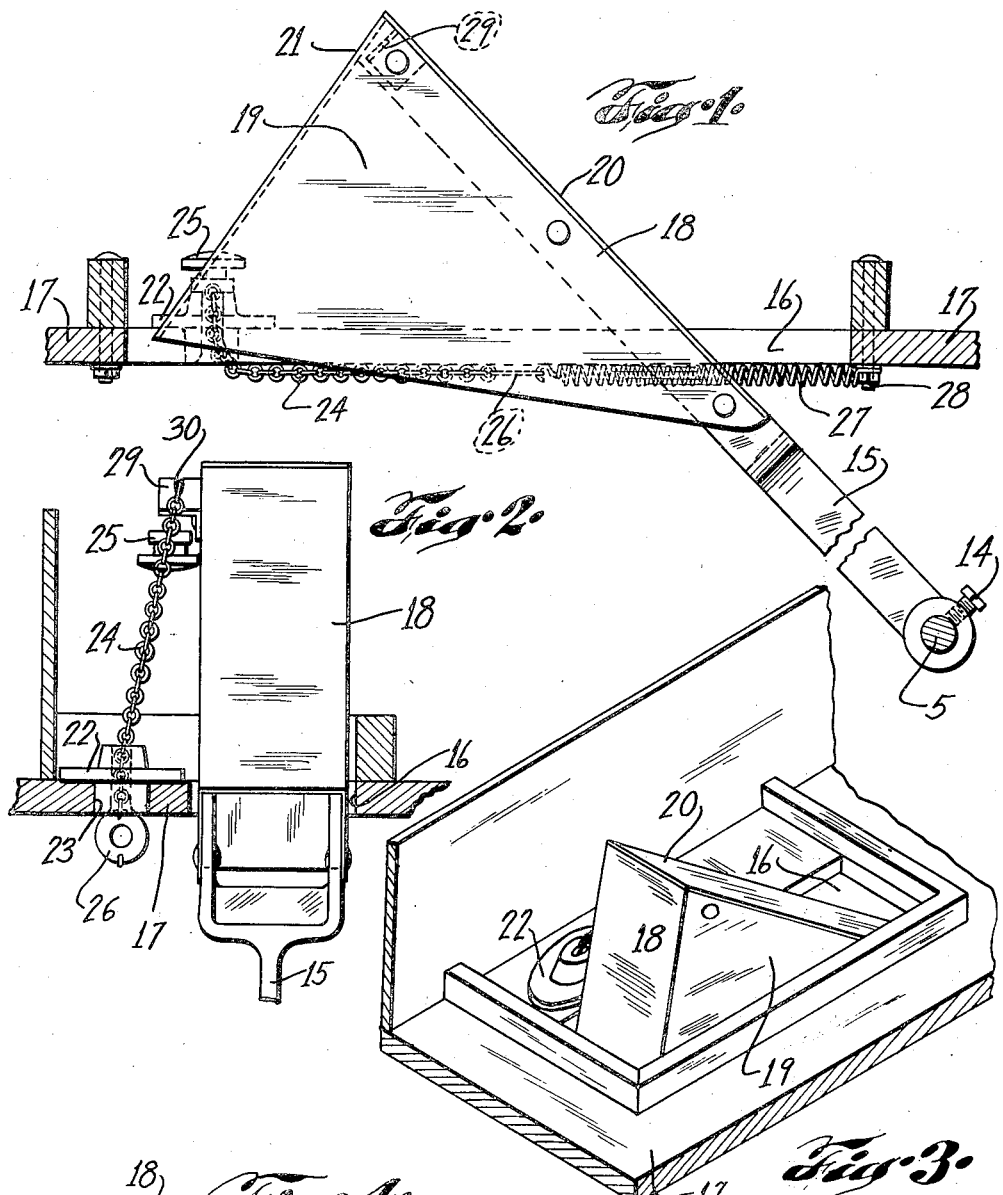
INVENTOR.
CHARLES G. MAHANA
BY
Ray M Eilers
ATTORNEY.

Patented Dec. 11, 1934                                                    1,983,628

UNITED STATES PATENT OFFICE 1,983,628

VEHICLE CONTROL

Charles G. Mahana, Three Rivers, Mich., assignor to Fairbanks, Morse & Co., Chicago, Ill., a corporation of Illinois Application May 2, 1932, Serial No. 608,681

4 Claims. (Cl. 188—265)

This invention relates to improvements in vehicle controls, and more particularly to foot-actuated controls for vehicle brakes, although susceptible of general application to a wide variety of foot-actuated control members.

An object of the present invention is attained in a pedal assembly of especial adaptation to vehicles such as railway motor cars, in which a substantially horizontal floor or deck is usually employed, both as a rest for the feet, adjacent the foot control elements, and also for the haulage of tools, track construction materials and the like. A difficulty exists in prevailing cars, in that tools, track equipment and the like are apt to be casually moved, as by gravity or vibration, to a position beneath the brake pedal and the floor or deck through which the brake lever projects, and so prevent or interfere with manipulation of a pedal of usual type. The present invention serves fully to obviate this hazard and difficulty.

Yet another object of the invention is attained in a novel construction of foot-controlled actuating member such that the full range of movement cannot, in any manner, be interfered with by accidental introduction of articles beneath it.

A still further object of the invention is attained in an improved and novel means whereby a control pedal, such as a brake pedal for example, may be latched or retained in a predetermined setting, so as to eliminate the necessity of maintaining braking pressure on the control member or pedal, throughout the time when vehicle braking effects are necessary.

Yet another object of the invention is attained in an improved brake pedal member which may be formed of a light material, such as pressed sheet metal, and so formed as to constitute a closed housing, extending, in any position of the pedal, between the pedal surface and a subjacent floor or deck, and being of a transverse dimension or width, throughout its depth, at least equal to the width of the foot-engaged surface.

The foregoing and additional objects will more fully appear as the description proceeds, and from the appended drawing forming a part of the specification. In the drawing:

Fig. 1 is a side elevation of a pedal member and related parts, including a fragmentary portion of an associated floor or deck structure; Fig. 2 is an end elevation of the structure appearing in Fig. 1; Fig. 3 is an elevation in perspective, of a preferred form of pedal, also showing a portion of the floor or deck extending thereabout, and Fig. 4 is a diagram showing an application of the invention to a brake system for a railway motor car.

Referring now by characters of reference to the drawing, the invention is illustrated by describing in detail an application thereof to a brake system of a railway motor car, such system including a transversely disposed, rockable brake shaft 5, carried in suitable journals on the frame members of the car. Shaft 5 serves to carry at each end, an arm 6 which is secured to the shaft, each arm 6 pivotally engaging a link 7, the opposite end of the link 7 being pivotally connected, as through a pin 8, to a pair of toggle arms 9 and 10, each connected through suitable pivotal connections to one of a pair of opposed brake shoes 11 and 12. In this embodiment the link 10 may be composed of threadedly extensible sections, so as to provide for adjustment of the shoes 11 and 12 to enable the maximum pressure to be applied through the controls, hereinafter described, and in order to keep the shoes 11 and 12 clear of the periphery of the vehicle wheels, when the controls are in their normal or inoperative positions. The shoes 11 and 12 may be pivotally mounted through pins 13 to the frame of the car.

Secured to the shaft 5 as by a suitable set screw 14 (Fig. 1), is a control arm 15 preferably formed of a rigid metal member projecting at a substantial angle through an opening 16 in a floor or deck structure 17; the opening 16 preferably corresponding in width to the greatest width of the pedal, hereinafter described.

The pedal preferably consists of a pressed member 18, bent into substantially a U shaped transverse section, and including plane parallel lateral wall portions 19, each being by preference of substantially triangular aspect, and a foot-receiving portion 20 normally lying at a convenient angle to the horizontal floor or deck structure 17 and disposed at a right angle to each of the lateral guard or wing portions 19. The end 21 is preferably closed by a portion of the sheet metal body forming the other parts of the pedal 18. The pedal arm 15 may be secured to pedal 18, preferably internally thereof, as by riveting, welding or any other suitable fastening expedient.

It will appear from the foregoing description of the pedal structure that it is distinguishable from those which are generally known to the art, in that it is in the nature of a hollow element, imperforate throughout those portions disposed at any time above the floor or deck 17, whereby bars, jacks, wrenches, and other track equipment necessary to be transported in railway motor cars, are precluded from being casually misplaced between the outwardly projecting end of lever 15, and the floor or deck structure, thus precluding any impairment of a full braking actuation of the lever 15. While, for convenience and economy of construction, I prefer to form the pedal proper of pressed sheet metal as described, this member may consist of a block of wood or a solid metal member, the essential feature being that, whatever position of the pedal, there is no laterally-open space at any time between the foot-engaged pedal surface, and the subjacent floor.

In the operation of railway motor cars it frequently happens that unless some provision is made for locking the brake controls in engaged position, it is necessary for the operator to apply braking pressure to the pedal, for long periods of time, for example, when descending long grades. To obviate this necessity I have provided a brake-latching or -retaining device by means of which the brake control pedal may be latched in any brake-setting position, with any desired degree of pressure, and kept in such position without further effort until the latch is released.

The expedient presently preferred for this purpose is shown as consisting of a deck flange or bushing 22, the deck being provided with an aperture 23, to receive the flange, which may be secured thereto as by screws or bolts, (not shown). Extending through the apertured flange 22, is a chain 24, one or the outer end of which is provided with a latching knob 25, and the other or inner end of which serves to engage a stop member 26, consisting in the present example, of a washer perforated at diametrally opposite points. The aperture of washer 26, opposite its anchorage to the chain 24, serves to receive a hook end of a spring 27, the spring being disposed by preference horizontally beneath the deck structure 17, and the opposite end of the spring being anchored to a bolt 28.

The pedal 18 is provided with a lateral projection or clip 29, which may be secured as by riveting or welding to one side wall 19 of the pedal. Clip 29 is notched as at 30, this notch being of such a width and depth that while any one link of the chain 24 may be inserted in the notch, the adjacent link, being transverse to the link within the notch, will not pull therethrough, thus enabling the chain to be inserted in the notch of the clip at any selected point between the knob 25 and the washer 26.

In utilizing the latch, the brake pedal 18 is depressed to the desired extent, the chain 24 is pulled outwardly through the deck flange 22 as far as permitted by the washer, the washer serving as a stop against further retraction of the chain, as shown by Fig. 2. With the chain thus fully withdrawn, the pedal 18 is linked up to keep it as close as possible to the deck and deck flange. The chain is thus under tension and the pedal held thereby in its brake-engaging position, as long as desired, without further effort on the part of the operator. When it is desired to release the brake the knob 25 may again be utilized to lift the chain out of the notch 30 of clip 29, following which the brake pedal will resume its normal position of rest, releasing the brake. The tension previously put on spring 27 by retraction of the chain 24, serves to restore the chain and knob to a position of concealment as shown in Fig. 1.

It will appear from the foregoing description that the device described serves as an economical and yet positive expedient for latching a brake or other control of the type described, in a predetermined operative or control position. The simplicity of the arrangement described is evidenced by the fact that no more than the five parts described, need be employed. The anchorage bolt 28 may conveniently consist of any of the usual assembly bolts of the structure, without providing a separate anchorage for this purpose.

It will further appear that the structure described, and particularly the novel form of track pedal element, serves positively to preclude any stoppage of brake actuating control movement by reason of interference from tools or equipment usually carried on the floor of a vehicle equipped with a brake system of the present order.

While I have described the invention by making particular and specific reference to a preferred embodiment thereof, it will be understood that a number of changes in the parts, their combinations, as well as their assembly, may be made within the scope and intendment of the invention as defined by the claims hereunto appended.

I claim:

1. A latch for a control member of a railway motor car having a deck structure, the latch including a chain, a tubular chain guide projecting through the deck structure, a stop carried by each end of the chain and coacting with the guide, a notched chain anchorage carried by the control member, and adapted separately to engage the individual links of the chain, a spring connected to the inner end of the chain for retracting the chain when in non-latching relation to the control member, and an anchorage for the spring, the length of the spring and chain being such that they are kept in concealed position beneath and along the deck of the car, irrespective of engagement of the chain and control member.

2. In a railway motor car provided with a floor or deck structure, a foot control for brakes, including a control lever extending through the floor or deck structure, a pedal in exposed position above the floor structure, and engaging the control lever, a pedal latch including a chain projecting through the floor adjacent the pedal and adapted to be withdrawn above the floor for latching engagement with the pedal, a flanged tubular eye in the deck, through which the chain extends an element projecting laterally of the pedal and provided with a notch adapted to accommodate the individual links of the chain, a stop on the inner end of the chain beneath the floor structure, a chain-retracting spring anchored at one end to said stop, and a fixed anchorage below the deck at the opposite end of the spring, the anchorage and eye being spaced to keep the chain and spring taut when the chain is in retracted position.

3. In a railway motor car, in combination, a horizontal deck structure, a brake control lever projecting through an opening therefor in the deck structure, a pedal secured to the control lever, a notched latch clip projecting laterally of the pedal, a pedal-latch coacting with said clip and including a chain, the deck having an aperture therethrough, an eye member in said aperture to pass said chain, a stop member secured to the inner end of said chain on the lower side of the floor structure, said stop member being of a size to prevent its passage through said chain aperture, a tension spring having its free end engaging said stop member, a fixed anchorage for the opposite end of said spring, disposed below the deck structure, and a knob on the outer or free end of the chain for limiting its retraction under influence of the spring, the spring being arranged to keep the chain taut, parallel to and beneath the deck structure when the pedal latch is out of engagement with the pedal.

4. In combination with a foot brake assembly for a railway motor car, a pedal arm, a pedal thereon, a latching device for selectively positioning the pedal, including a chain, an eye for the chain, carried by the deck of the car, an anchorage for the chain, spaced from the eye and located beneath the car deck, a spring connecting the chain to the anchorage, an extension carried by the pedal, and recessed or notched to receive the links of the chain at selected locations, whereby to secure the pedal in adjusted control positions, a stop at the spring-connected end of the chain, adapted to engage the eye to limit the outward movement of the chain, and a stop at the free end of the chain, adapted to engage and close the eye when the latching device is out of service.

CHARLES G. MAHANA.